United States Patent
Lin et al.

(10) Patent No.: US 9,621,028 B2
(45) Date of Patent: Apr. 11, 2017

(54) DIGITALLY CONTROLLED PFC CONVERTER WITH MULTIPLE DISCONTINUOUS MODES

(71) Applicant: Chengdu Monolithic Power Systems Co., Ltd., Chengdu (CN)

(72) Inventors: Sicong Lin, Hangzhou (CN); Wenbin Lu, Hangzhou (CN); Wangmiao Hu, Hangzhou (CN); Lijie Jiang, Hangzhou (CN); Qiming Zhao, Hangzhou (CN); Guangchao Zhang, San Jose, CA (US)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 65 days.

(21) Appl. No.: 14/692,465

(22) Filed: Apr. 21, 2015

(65) Prior Publication Data
US 2015/0303790 A1    Oct. 22, 2015

(30) Foreign Application Priority Data
Apr. 22, 2014    (CN) .......................... 2014 1 0163169

(51) Int. Cl.
*H02M 1/42*    (2007.01)
*H02M 1/00*    (2006.01)

(52) U.S. Cl.
CPC .. *H02M 1/4225* (2013.01); *H02M 2001/0012* (2013.01); *H02M 2001/0019* (2013.01); *Y02B 70/126* (2013.01)

(58) Field of Classification Search
CPC .... H02M 1/42–1/08-2001/4291; H02M 3/157

USPC ........... 363/89; 323/205, 207, 222, 283, 285
See application file for complete search history.

(56) References Cited

U.S. PATENT DOCUMENTS

| | | | |
|---|---|---|---|
| 8,278,899 B2 * | 10/2012 | Schafmeister | H02M 3/156 323/283 |
| 2007/0063682 A1 * | 3/2007 | Dagher | H02M 3/157 323/282 |
| 2014/0003105 A1 | 1/2014 | Lin | |
| 2014/0285163 A1 | 9/2014 | Lin | |
| 2015/0048807 A1 * | 2/2015 | Fan | H02M 1/42 323/208 |

OTHER PUBLICATIONS

Jingquan Chen, A. Prodic, R. W. Erickson and D. Maksimovic, "Predictive digital current programmed control," in IEEE Transactions on Power Electronics, vol. 18, No. 1, pp. 411-419, Jan 2003.*

* cited by examiner

*Primary Examiner* — Harry Behm
*Assistant Examiner* — Peter Novak

(57) ABSTRACT

A PFC circuit having a switching circuit and a control circuit, the control circuit controls an operation mode of the switching circuit based on an input current and a switching frequency of the switching circuit, when the switching circuit works under a continuous current mode, the switching circuit is turned ON when the input current is less than an OFF current reference signal, and when the switching circuit works under a first discontinuous mode or a second discontinuous mode, the switching circuit is turned ON after a turn ON delay time period when the input current is less than the OFF current reference signal.

20 Claims, 8 Drawing Sheets

DIGITALLY CONTROLLED PFC CONVERTER WITH MULTIPLE DISCONTINUOUS MODES

CROSS-REFERENCE TO RELATED APPLICATION(S)

This application claims the benefit of CN application No. 201410163169.9, filed on Apr. 22, 2014, and incorporated herein by reference.

TECHNICAL FIELD

The present invention relates to electrical circuit, more particularly but not exclusively relates to power factor correction (PFC) circuit and associated control circuit and control method.

BACKGROUND

Power Factor Correction (PFC) circuit is widely used in power converter in order to control phase of input current and improve power factor. FIG. 1 illustrates a waveform diagram in a PFC control. An input voltage Vin is a half-sine waveform signal, and is usually rectified from a power grid which is an Alternating-Current (AC) sine wave. Waveform shape of an input current Iin needs to follow waveform shape of input voltage Vin to implement PFC control, that is phase of input current Iin should be same with phase of input voltage Vin. Generally, a relatively high input voltage Vin corresponds to a relatively low average input current Iin_avg. In a switching mode PFC circuit, waveform shape of input current Iin is a saw tooth shape, and power factor can be improved by controlling waveform shape of average input current Iin_avg to follow waveform shape of input voltage Vin, as a result PFC control is achieved.

At the meantime, the international energy agency puts forward high requirements in power conversion efficiency of PFC circuit. However, light load efficiency of the present PFC products is hard to meet the requirements well.

Accordingly, an improved PFC circuit with high efficiency, especially at light load is required.

SUMMARY

It is one of the objects of the present invention to provide a PFC circuit, a control circuit and associated control method for the PFC circuit.

One embodiment of the present invention discloses a control method for controlling a power factor correction circuit, wherein the power factor correction circuit comprises a switching circuit having an input terminal configured to receive an input voltage and an input current, and an output terminal configured to provide an output voltage, the control method comprising: providing a peak current sampling signal indicative of a maximum value of the input current; providing an input voltage sampling signal indicative of the input voltage; providing an output voltage sampling signal indicative of the output voltage; providing a current reference signal based on the input voltage sampling signal, the output voltage sampling signal and a voltage reference signal; providing a turn ON delay time period based on the peak current sampling signal and the current reference signal; providing a comparison signal via comparing the input current with an OFF current reference signal; determining an operation mode of the switching circuit based on the input current and a switching frequency of the switching circuit, wherein the operation mode comprises a continuous current mode, a first discontinuous current mode and a second discontinuous current mode; and turning ON the switching circuit based on the comparison signal, and turning OFF the switching circuit when an ON-time period of the switching circuit equals a predetermined ON-time period; wherein when the switching circuit works under the continuous current mode, turning ON the switching circuit when the input current is less than the OFF current reference signal, and calculating the predetermined ON-time period based on the input voltage sampling signal; wherein when the switching circuit works under the first discontinuous current mode, turning ON the switching circuit after the turn ON delay time period when the input current is less than the OFF current reference signal, and calculating the predetermined ON-time period based on the input voltage sampling signal; and wherein when the switching circuit works under the second discontinuous current mode, turning ON the switching circuit after the turn ON delay time period when the input current is less than the OFF current reference signal, and calculating the predetermined ON-time period based on the input voltage sampling signal, the current reference signal and the peak current sampling signal.

Another embodiment of the present invention discloses a control circuit for controlling a power factor correction circuit, wherein the power factor correction circuit comprises a switching circuit having an input terminal configured to receive an input voltage and an input current, and an output terminal configured to provide an output voltage, the control circuit comprising: an AD conversion control module configured to provide an input voltage sampling signal based on the input voltage, an output voltage sampling signal based on the output voltage, and a peak current sampling signal based on the input current; a DA conversion unit configured to provide an OFF current reference signal based on a digital OFF current reference signal; a current reference computing module configured to provide a current reference signal based on the input voltage sampling signal and the output voltage sampling signal; a mode control module configured to provide a mode control signal based on the current reference signal, the peak current sampling signal and a switching frequency of the switching circuit; and a pulse generator configured to provide a switching control signal to control the switching circuit, wherein the switching control signal is configured to turn OFF the switching circuit based on a predetermined ON-time period; wherein when the mode control signal is at a first state, the switching circuit works under a continuous current mode, and the switching control signal is configured to turn ON the switching circuit when a feedback signal indicative of the input current is less than the OFF current reference signal; wherein when the mode control signal is at a second state, the switching circuit works under a first discontinuous current mode, and the switching circuit after a turn ON delay time period when the feedback signal indicative of the input current is less than the OFF current reference signal; and wherein when the mode control signal is at a third state, the switching circuit works under a second discontinuous current mode, and the switching control signal is configured to turn ON the switching circuit after the turn ON delay time period when the feedback signal indicative of the input current is less than the OFF current reference signal.

Yet another embodiment of the present invention discloses a power factor correction circuit, comprising: a switching circuit having an input terminal and an output terminal, wherein the input terminal is configured to receive an input voltage and an input current, and the output terminal is configured to provide an output voltage; an AD conversion control module configured to provide an input voltage sampling signal indicative of the input voltage, an output voltage sampling signal indicative of the output voltage, and a peak current sampling signal indicative of indicative of the input current; a DA conversion unit configured to provide an OFF current reference signal based on a digital OFF current reference signal; a comparison circuit configured to provide a comparison signal based on the OFF current reference signal and the input current; a mode control module configured to provide a mode control signal based on a current reference signal, the peak current sampling signal and a switching frequency of the switching circuit; and a pulse generator configured to turn ON the switching circuit based on the comparison signal and a turn ON delay time period, and turn OFF the switching circuit based on a predetermined ON-time period; wherein when the mode control signal is at a first state, the switching circuit works under a continuous current mode, when the mode control signal is at a second state, the switching circuit works under a first discontinuous current mode, and when the mode control signal is at a third state, the switching circuit works under a second discontinuous current mode, wherein the switching frequency of the switching circuit is constant when the switching circuit works under the second discontinuous current mode.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Several embodiments of the present invention are described below with reference to PFC circuit, control circuit and associated control method. As used hereinafter, the term "couple" generally refers to multiple ways including a direct connection with an electrical conductor and an indirect connection through intermediate diodes, resistors, capacitors, and/or other intermediaries.

Figure 1:
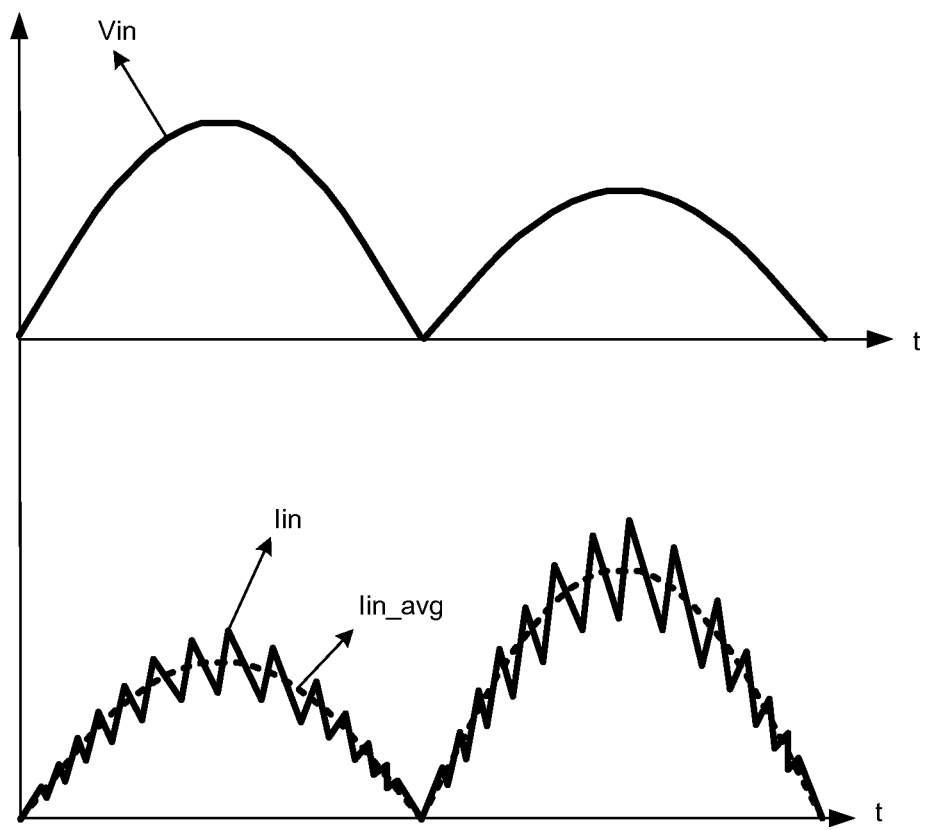
FIG. 1 illustrates a waveform diagram in a PFC control.
Figure 2:
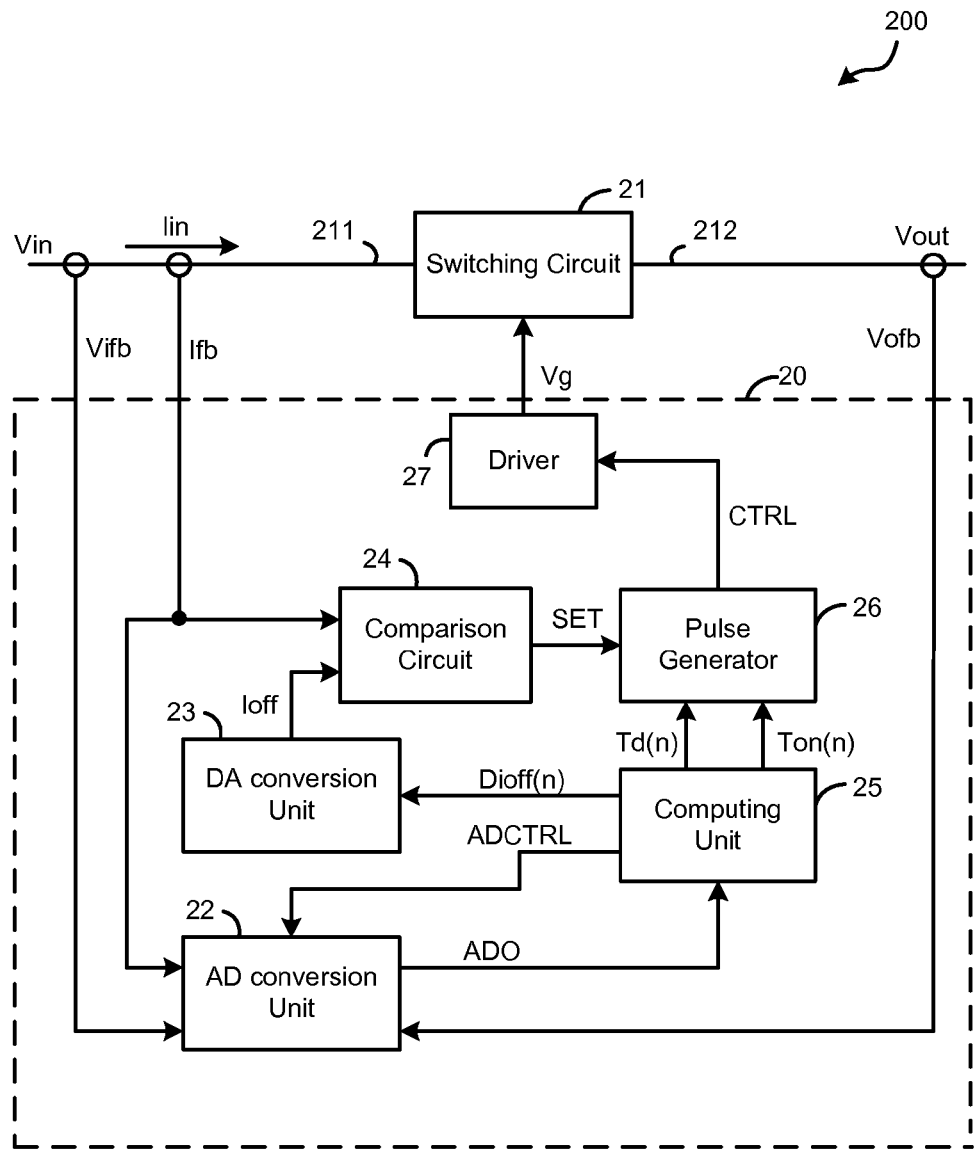
FIG. 2 illustrates a block diagram of a PFC circuit 200 according to an embodiment of the present invention.

FIG. 2 illustrates a block diagram of a PFC circuit 200 according to an embodiment of the present invention. PFC circuit 200 comprises a switching circuit 21 and a control circuit 20. Switching circuit 21 has an input terminal 211 configured to receive an input voltage Vin and an output terminal 212 configured to provide an output voltage Vout via turning ON and turning OFF switching circuit 21. An input current Iin at input terminal 211 of switching circuit 21 is regulated by PFC circuit 200. Control circuit 20 comprises an analog-to-digital (AD) conversion unit 22, a digital-to-analog (DA) conversion unit 23, a comparison circuit 24, a computing unit 25 and a pulse generator 26. AD conversion unit 22 is coupled to input terminal 211 of switching circuit 21 to receive input voltage Vin and input current Iin, coupled to output terminal 212 of switching circuit 21 to receive output voltage Vout, and is configured to provide a digital sampling signal ADO based on input voltage Vin, input current Iin and output voltage Vout. DA conversion unit 23 is configured to provide an OFF current reference signal Ioff based on a digital OFF current reference signal Dioff(n). Comparison circuit 24 has a first input terminal coupled to DA conversion unit 23 to receive OFF current reference signal Ioff, a second input terminal coupled to input terminal 211 of switching circuit 21 to receive input current Iin, and an output terminal configured to provide a comparison signal SET via comparing input current Iin with OFF current reference signal Ioff. Computing unit 25 is coupled to AD conversion unit 22 to receive digital sampling signal ADO and is configured to provide a sampling control signal ADCTRL, digital OFF current reference signal Dioff(n), a turn ON delay time period Td(n), and a predetermined ON-time period Ton(n). Pulse generator 26 is coupled to comparison circuit 24 to receive comparison signal SET, and coupled to computing unit 25 to receive turn ON delay time period Td(n) and predetermined ON-time period Ton(n), and is configured to provide a switching control signal CTRL to turn ON and turn OFF switching circuit 21. In one embodiment, pulse generator 26 is configured to turn ON switching circuit 21 based on comparison signal SET and delay time period Td(n), and turn OFF switching circuit 21 based on predetermined ON-time period Ton(n). Where n represents a present control cycle. In one embodiment, computing unit 25 and/or pulse generator 26 may be implemented by a digital circuit, e.g., Field Programmable Gate Array (FPGA), Digital Signal Processor (DSP), and Application Specific Integrated Circuit (ASIC) and so on.

Control circuit 20 shown in FIG. 2 implements cycle by cycle input current control for sinusoid current waveform without current loop, which is easy to implement and convenient to calculate, and control circuit 20 can work in both a continuous current mode and a discontinuous current mode with high efficiency and good power factor at light load.

Control circuit 20 may further comprise a driver 27 as shown in FIG. 2. Driver 27 is coupled to pulse generator 26 to receive switching control signal CTRL, and is configured to provide driving signal Vg to drive switching circuit 21.

In one embodiment, PFC circuit 200 further comprises an input voltage feedback circuit. The input voltage feedback circuit is coupled to input terminal 211 of switching circuit 21 to receive input voltage Vin, and is configured to provide a feedback signal Vifb indicative of input voltage Vin. The input voltage feedback circuit may comprise any suitable voltage feedback circuit, such as resistor divider. For simplicity, FIG. 2 does not show the input voltage feedback circuit. In one embodiment, PFC circuit 200 further comprises an input current feedback circuit. The input current feedback is coupled to input terminal 211 of switching circuit 21 to receive input current Iin, and is configured to provide a feedback signal Ifb indicative of input current Iin. In one embodiment, input current feedback signal Ifb is a voltage signal in proportion to input current Iin. For simplicity, FIG. 2 does not show the input current feedback circuit. In one embodiment, PFC circuit 200 further comprises an output voltage feedback circuit. The output voltage feedback circuit is coupled to output terminal 212 of switching circuit 21 to receive output voltage Vout, and is configured to provide a feedback signal Vofb indicative of output voltage Vout. In one embodiment, the output feedback circuit is a resistor divider. For simplicity, FIG. 2 does not show the output voltage feedback circuit.

Figure 3:
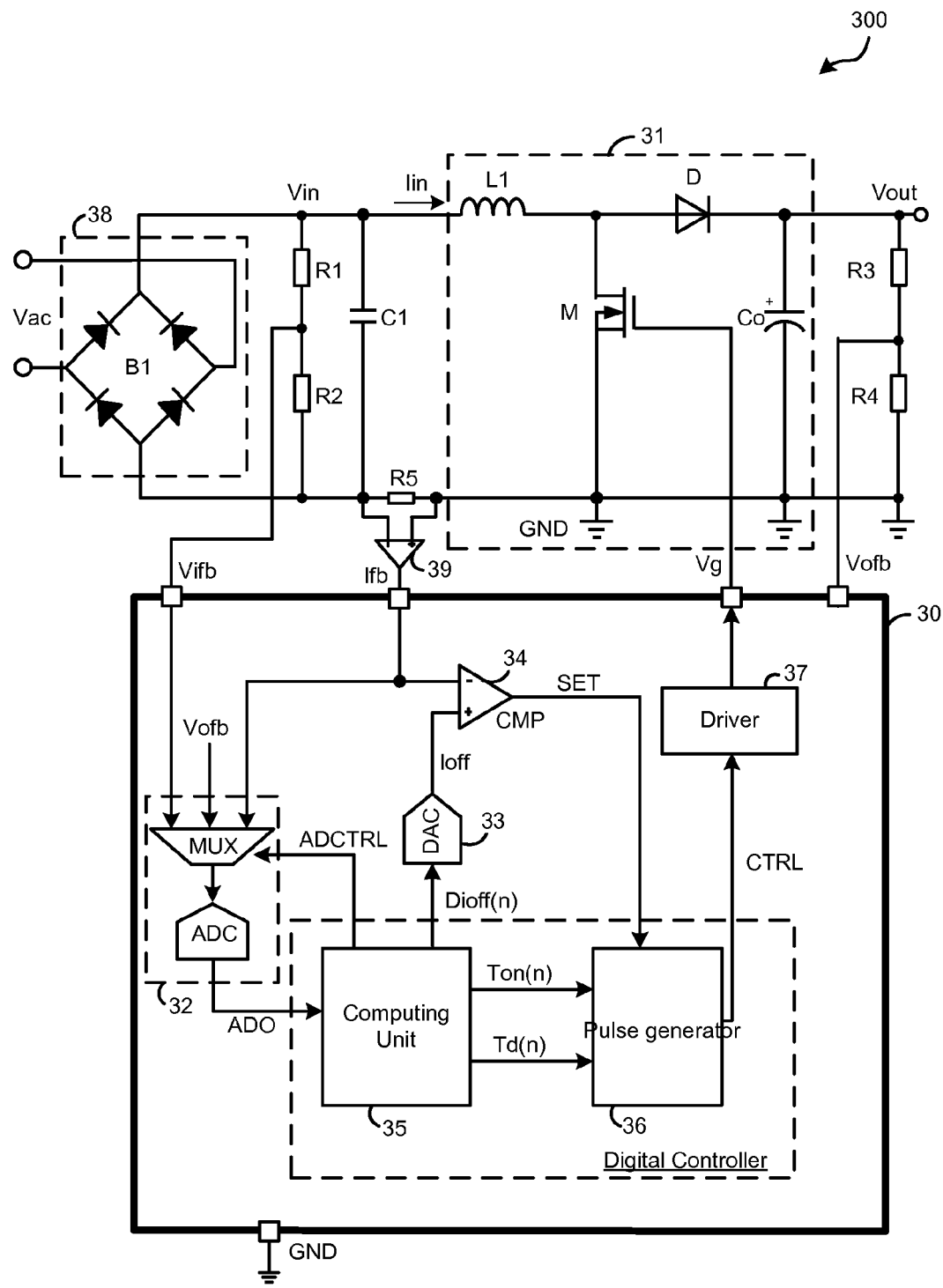
FIG. 3 illustrates a circuit diagram a PFC circuit 300 according to an embodiment of the present invention.

FIG. 3 illustrates a circuit diagram a PFC circuit 300 according to an embodiment of the present invention. PFC circuit 300 comprises a rectifier 38, a switching circuit 31 and a control circuit 30. In another embodiment, PFC circuit 300 may not comprise rectifier 38. As shown in FIG. 3, rectifier 38 is configured to provide half-sine waveform input voltage Vin by rectifying sine waveform AC signal Vac. In the following description, symbol "Vin" may represent input voltage Vin or an input terminal of switching circuit 31, symbol "Vout" may represent output voltage Vout or an output terminal of switching circuit 31. Symbol "Vifb" may represent feedback signal Vifb or pin Vifb, symbol "Ifb" may represent feedback signal Ifb or pin Ifb, symbol "Vofb" may represent feedback signal Vofb or pin Vofb, symbol "GND" may represent a reference ground GND or pin GND, and symbol "Vg" may represent a driving signal Vg or pin Vg.

As shown in FIG. 3, switching circuit 31 comprises a boost converter. Switching circuit 31 has input terminal Vin and output terminal Vout. Switching circuit 31 comprises a power switch M, an inductor L1, a diode D, and an output capacitor Co. Inductor L1 has a first terminal coupled to receive input voltage Vin, and a second terminal coupled to a first terminal of power switch M. A second terminal of power switch M is coupled to reference ground GND, and a control terminal of power switch M is configured to receive driving signal Vg. An anode of diode D is coupled to the second terminal of inductor L1, a cathode of diode D is coupled to a first terminal of output capacitor Co to provide output voltage Vout. A second terminal of output capacitor Co is coupled to reference ground GND. Diode D may be substituted by a switch. FIG. 3 shows an input capacitor C1; however, PFC circuit 300 may not comprise input capacitor C1. Switching circuit 31 is configured to regulate output voltage Vout and input current Iin via turning ON and turning OFF power switch M. In another embodiment, switching circuit 31 comprises buck-boost converter. In the embodiment shown in FIG. 3, a current flowing through inductor L1 is input current Iin, i.e., input current feedback signal Ifb is indicative of the current flowing through inductor L1.

Control circuit 30 may be integrated on a chip, and has pins Vifb, Ifb, Vofb, Vg, and GND. Pin Vifb is configured to receive input voltage Vin or feedback signal Vifb. Pin Ifb is configured to receive input current Iin or feedback signal Ifb. Pin Vofb is configured to receive output voltage Vout or feedback signal Vofb. Pin Vg is coupled to the control terminal of power switch M. As shown in FIG. 3, a resistor divider comprising resistors R1 and R2 is configured to provide feedback signal Vifb, a resistor divider comprising resistors R3 and R4 is configured to provide feedback signal Vofb, and an input current feedback circuit comprising a resistor R5 and a differential amplifier 39 is configured to provide feedback signal Ifb.

Control circuit 30 comprises an AD conversion unit 32, a DA conversion unit 33, a comparison circuit 34, a computing unit 35, a pulse generator 36 and a driver 37. AD conversion unit 32 is configured to provide digital sampling signal ADO based on feedback signal Vifb, feedback signal Ifb and feedback signal Vofb. As shown in FIG. 3, AD conversion unit 32 comprises a multiplexer MUX and an AD converter ADC. Based on sampling control signal ADCTRL, multiplexer MUX is configured to provide one of feedback signal Vifb, feedback signal Ifb and feedback signal Vofb to AD converter ADC which is configured to provide digital sampling signal ADO accordingly. Digital sampling signal ADO may be a serial data signal or a parallel data signal. DA conversion unit 33 comprises a DA converter DAC, which is coupled to computing unit 35 to receive digital OFF current reference signal Dioff(n), and provide OFF current reference signal Ioff based on digital OFF current reference signal Dioff(n). Comparison circuit 34 comprises a comparator CMP. A non-inverting terminal of comparator CMP is configured to receive feedback signal Ifb, an inverting terminal of comparator CMP is coupled to DA converter DAC to receive OFF current reference signal Ioff, and an output terminal of comparator CMP is configured to provide comparison signal SET via comparing feedback signal Ifb with OFF current reference signal Ioff. In one embodiment, when feedback signal Ifb is smaller than OFF current reference signal Ioff, comparison signal SET becomes high voltage level. Computing unit 35 is configured to provide sampling control signal ADCTRL to control AD conversion sequence of AD conversion unit 32. Computing unit 35 is also configured to provide digital OFF current reference signal Dioff(n), predetermined ON-time period Ton(n) and turn ON delay time period Td(n) based on digital sampling signal ADO. Based on comparison signal SET, predetermined ON-time period Ton(n) and delay time period Td(n), pulse generator 36 is configured to provide switching control signal CTRL to turn ON and turn OFF power switch M. In one embodiment, pulse generator 36 is configured to turn ON power switch M based on comparison signal SET and turn ON delay time period Td(n), and turn OFF power switch M based on predetermined time period Ton(n). When feedback signal Ifb is smaller than OFF current reference signal Ioff, switching control signal CTRL is configured to turn ON power switch M after turn ON delay time period Td(n); and when an ON-time period of power switch M equals predetermined time period Ton(n), switching control signal CTRL is configured to turn OFF power switch M. Pulse generator 36 is configured to control an OFF—time period of power switch M based on comparison signal SET and turn ON delay time period Td(n), and control the ON-time period of power switch M based on predetermined time period Ton(n). In one embodiment, computing unit 35 and pulse generator 36 are implemented by a digital controller. Driver 37 is configured to provide driving signal Vg to drive power switch M based on switching control signal CTRL.

Figure 4:
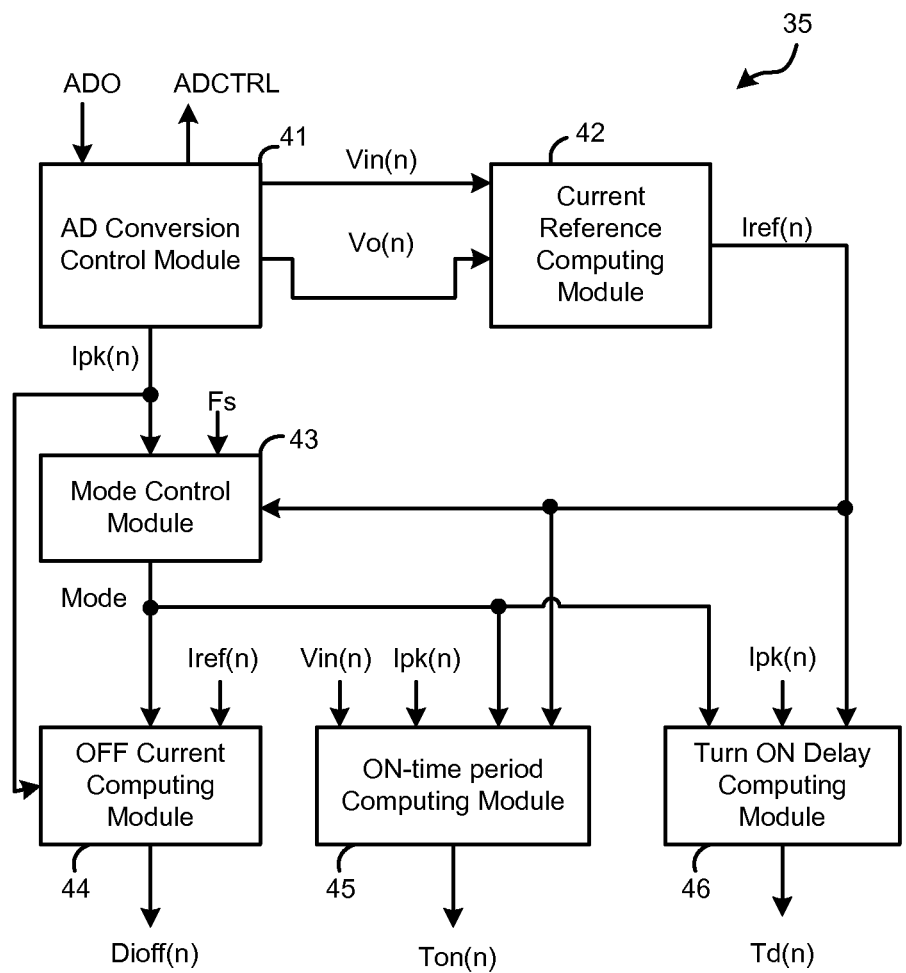
FIG. 4 illustrates a computing unit 35 according to an embodiment of the present invention.

FIG. 4 illustrates computing unit 35 according to an embodiment of the present invention. Computing unit 35 comprises an AD conversion control module 41, a current reference computing module 42, a mode control module 43, an OFF current computing module 44, an ON-time period computing module 45, and a turn ON delay computing module 46.

Figure 5:
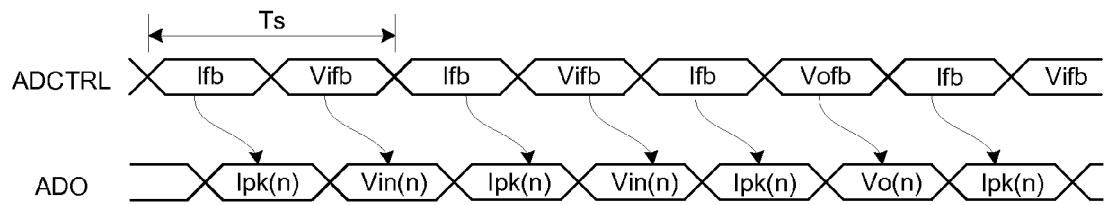
FIG. 5 shows waveform diagram of sampling sequence of an analog-to-digital conversion unit 32 with reference to FIG. 3 according to an embodiment of the present invention.

AD conversion control module 41 is configured to provide sampling control signal ADCTRL to control sampling sequence and AD conversion sequence of AD conversion unit 32. AD conversion control module 41 is configured to receive digital sampling signal ADO, based on digital sampling signal ADO and sampling control signal ADCTRL, AD conversion control module 41 is configured to provide an input voltage sampling signal Vin(n) corresponding to input voltage Vin, a peak current sampling signal Ipk(n) corresponding to a maximum value of input current Iin and an output voltage sampling signal Vo(n) corresponding to output voltage Vout. FIG. 5 shows a waveform diagram of sampling sequence of AD conversion unit 32. Sampling control signal ADCTRL is configured to control sampling sequence of AD conversion unit 32, e.g., sampling input current Iin, input voltage Vin and output voltage Vo successively during each switching period, or sampling input current Iin once during each switching period, sampling input voltage Vin twice during each three switching periods and sampling output voltage Vout once during each three switching periods as shown in FIG. 5.

Figure 6:
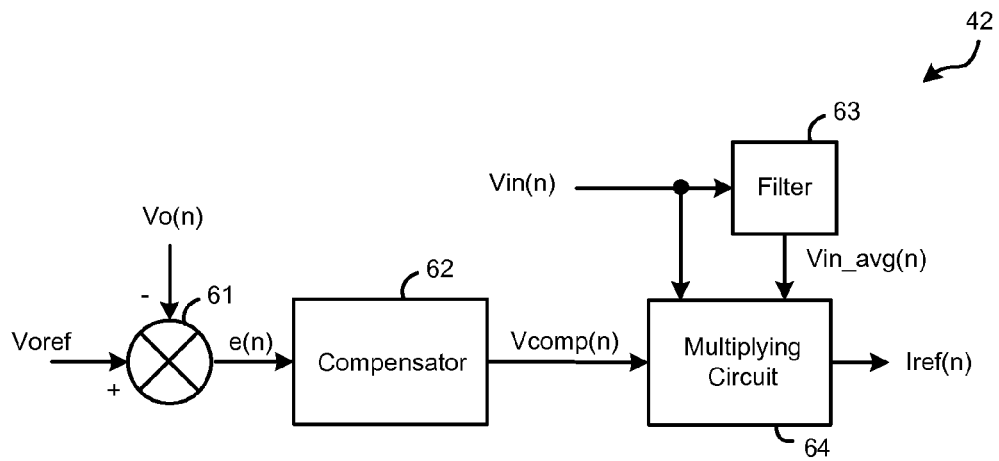
FIG. 6 illustrates a current reference computing module 42 according to an embodiment of the present invention.

Current reference computing module 42 is configured to provide a current reference signal Iref(n) based on input voltage sampling signal Vin(n) and output voltage sampling signal Vo(n). FIG. 6 shows a detailed circuit of current reference computing module 42 according to an embodiment of the present invention.

Mode control module 43 is configured to provide a mode control signal Mode to control an operation mode of switching circuit 31 based on peak current sampling signal Ipk(n), current reference signal Iref(n) and a switching frequency Fs of switching circuit 31. Switching circuit 31 is configured to work under a continuous current mode, a first discontinuous current mode or a second discontinuous current mode according to mode control signal Mode. OFF current computing module 44 is configured to provide digital OFF current reference signal Dioff(n) according to the operation mode of switching circuit 31. ON-time period computing module 45 is configured to provide predetermined ON-time period Ton(n) according to the operation mode of switching circuit 31. Turn ON delay computing module 46 is configured to provide turn ON delay time period Td(n) according to the operation mode of switching circuit 31. In one embodiment, when switching circuit 31 works under the continuous current mode, switching frequency Fs is constant or almost constant, and a switching period of power switch M is Ts1; when switching circuit 31 works under the first discontinuous current mode, switching frequency Fs varies with load, and the switching period of power switch M is Ts2; and when switching circuit 31 works under the second discontinuous current mode, switching frequency Fs is constant or almost constant, and the switching period of power switch M is Ts3. In one embodiment, the switching period of power switch M satisfies the following relations: Ts3>Ts2>Ts1. In one embodiment, when peak current sampling signal Ipk(n) is less than or equals twice of current reference signal Iref(n), i.e., Ipk(n)<=2 Iref(n), mode control signal Mode is at a first state, e.g., Mode=1, and switching circuit 31 works under the continuous current mode; when peak current sampling signal Ipk(n) is larger than twice of current reference signal Iref(n) and switching frequency Fs is higher than a minimum frequency threshold Fsmin, i.e., Ipk(n)>2 Iref(n) and Fs>Fsmin, mode control signal Mode is at a second state, e.g., Mode=2, and switching circuit 31 works under the first discontinuous current mode; and when peak current sampling signal Ipk(n) is larger than twice of current reference signal Iref(n) and switching frequency Fs is lower than or equals minimum frequency threshold Fsmin, i.e., Iref(n)>2Iref(n) and Fs<=Fsmin, mode control signal Mode is at a third state, e.g., Mode=3, and switching circuit 31 works under the second discontinuous current mode. Switching frequency Fs is limited at minimum frequency threshold Fsmin when switching circuit 31 works under the second discontinuous current mode, as a result, ultrasonic frequency is avoided with high efficiency at light load, and EMI (Electromagnetic Interference) is reduced.

OFF current computing module 44 is configured to provide digital OFF current reference signal Dioff(n) based on mode control signal Mode, current reference signal Iref(n) and peak current sampling signal Ipk(n). When mode control signal Mode is at the first state, digital OFF current reference signal Doiff(n) equals a difference between twice of current reference Iref(n) and peak current reference signal Ipk(n), i.e., Doiff(n)=2Iref(n)−Ipk(n). When mode control signal Mode is at the second state or the third state, digital OFF current reference signal Dioff(n) is constant, e.g., Dioff(n)=0.

ON-time period computing module 45 is configured to provide predetermined ON-time period Ton(n) based on mode control signal Mode, input voltage sampling signal Vin(n), current reference signal Iref(n) and peak current sampling signal Ipk(n). In one embodiment, predetermined ON-time period Ton(n) varies with input voltage Vin reversely, that is ON-time period Ton(n) decreases when input voltage Vin increases, and increases when input voltage Vin decreases. When mode control signal Mode is at the first state or the second state, predetermined ON-time period Ton(n) is:

$$Ton(n)=Tmin*[Voref-Vin(n)]/Voref \quad (1)$$

Where an output voltage reference signal Voref represents a target value of output voltage Vout, constant Tmin represents a target value of switching period Ts1 under the continuous current mode. In one embodiment, output voltage reference signal Voref and constant Tmin is set through a communication bus, such as I2C (Inter Integrated Circuit), SMBus (System Management Bus), and PMbus (Power Management Bus).

When mode control signal Mode is at the third state, PFC circuit 300 works under the second discontinuous current mode, predetermined ON-time period Ton(n) is:

$$Ton(n)=Tmax*2Iref(n)*[Voref-Vin(n)]/[Voref*Ipk(n)] \quad (2)$$

Where constant Tmax represents a target value of switching period Ts3 under the second discontinuous current mode, and constant Tmax is larger than constant Tmin. In one embodiment, constant Tmax is set through a communication bus, such as I2C, SMBus, and PMBus.

Turn ON delay computing Module 46 is configured to provide turn ON delay time period Td(n) based on mode control signal Mode, current reference signal Iref(n) and peak current sampling signal Ipk(n). In one embodiment, when mode control signal Mode is at the first state, PFC circuit 300 works under the continuous current mode, turn ON delay time period Td(n) is zero, switching control signal CTRL is configured to turn ON power switch M when current feedback signal Ifb is less than OFF current reference signal Ioff. When mode control signal Mode is at the second state, PFC circuit 300 works under the first discontinuous current mode, a delay time period Td1(n) is provided as:

$$Td1(n)=Tmin*Iref(n)/2Ipk(n)-Tmin \quad (3)$$

In one embodiment, turn ON delay time period Td(n) equals delay time period Td1(n). In another embodiment, turn ON delay computing module 46 calculates turn ON delay time period Td(n) exactly based on delay time period Td1(n) and an oscillation period Tzcd of input current Iin when input current Iin is discontinuous.

When mode control signal Mode is at the third state, PFC circuit works under the second discontinuous current mode, delay time period Td1(n) is provided as:

$$Td1(n)=Tmax-2Iref(n)*Tmax/Ipk(n) \quad (4)$$

Figure 7:
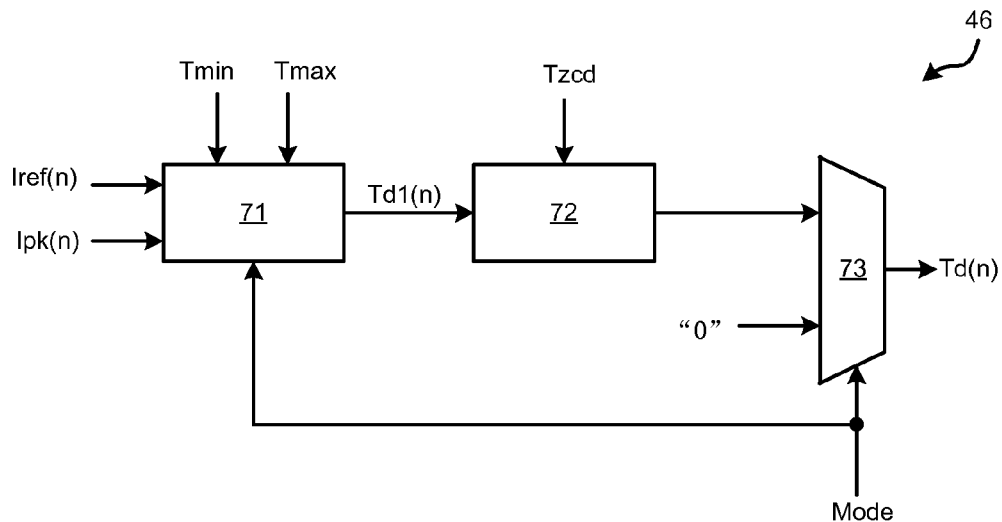
FIG. 7 illustrates a turn ON delay computing module 46 according to an embodiment of the present invention.

In one embodiment, turn ON delay time period Td(n) equals delay time period Td1(n). In another embodiment, turn ON delay computing module 46 calculates turn ON delay time period Td(n) exactly based on delay time period Td1(n) and an oscillation period Tzcd of input current Iin when input current Iin is discontinuous. FIG. 7 shows one embodiment of turn ON delay computing module 46.

Continuing refers to computing unit 35 shown in FIG. 4, switching circuit 31 may selectively works under different operation mode, i.e., the continuous current mode, the first discontinuous current mode, and the second discontinuous current mode, and computing unit 35 provides appropriate digital OFF current reference signal Dioff(n), predetermined ON-time period Ton(n) and turn ON delay time period Td(n) according to the operation mode of switching circuit 31. Computing unit 35 is convenient and easy to realize.

FIG. 5 shows a waveform diagram of sampling sequence of AD conversion unit 32 with reference to FIG. 3 according to an embodiment of the present invention. AD conversion unit 32 is configured to convert one of feedback signals Vifb, Ifb and Vofb based on sampling control signal ADCTRL, and provide digital sampling signal ADO accordingly. AD conversion control module 41 is configured to provide input voltage sampling signal Vin(n), peak current sampling signal Ipk(n) or output voltage sampling signal Vo(n) based on digital sampling signal ADO. In the embodiment shown in FIG. 5, AD conversion unit 32 is configured to sample twice in each switching period Ts under control of sampling control signal ADCTRL, wherein feedback signal Vifb is sampled twice in each three switching periods 3 Ts, feedback signal Ifb is sampled once in each switching period Ts, and feedback signal Vofb is sampled once in each three switching period 3 Ts.

FIG. 6 illustrates current reference computing module 42 according to an embodiment of the present invention. Current reference computing module 42 comprises a subtracting circuit 61, a compensator 62, a filter 63 and a multiplying circuit 64. Subtracting circuit 61 is configured to provide an error signal e(n) based on a difference between output voltage reference signal Voref and output voltage sampling signal Vo(n). Compensator 62 is configured to provide voltage compensation signal Vcomp(n) based on error signal e(n). Compensator 62 may adopt any suitable control method, such as PI (Proportional-Integral) control, PID (Proportional-Integral-Differential) control, and so on. Take PI control as one example, voltage compensation signal Vcomp(n) is:

$$Vcomp(n)=Vcomp(n-1)+a*e(n)+b*e(n-1) \quad (5)$$

Where a and b are control parameters, Vcomp(n) is a voltage compensation signal for a current control period, Vcomp(n-1) is a voltage compensation signal for a previous control period, e(n) is an error signal for the current control period, and e(n-1) is an error signal for the previous control period.

Filter 63 is configured to provide an average signal Vin_avg(n) indicative of average of input voltage sampling signal Vin(n). Multiplying circuit 64 is configured to provide current reference signal Iref(n) based on voltage compensation signal Vcomp(n), input voltage sampling signal Vin(n) and average signal Vin_avg(n). In one embodiment, current reference signal Iref(n) is:

$$Iref(n)=Vin(n)*Vcomp(n)/[Vin\_avg(n)]2 \quad (6)$$

Compensator 62 and/or multiplying circuit 64 may be implemented by lookup table (LUT) or multiplier.

FIG. 7 illustrates turn ON delay computing module 46 according to an embodiment of the present invention. Turn ON delay computing module 46 comprises a delay time computing module 71, a delay time adjusting module 72, and a selective circuit 73. In one embodiment, when mode control signal Mode is at the first state, switching circuit 31 works under the continuous current mode, delay time computing module 71 is disabled; when mode control signal Mode is at the second state, switching circuit 31 works under the first discontinuous current mode, delay time computing module 71 is configured to provide delay time period Td1(n) based on peak current sampling signal Ipk(n), current reference signal Iref(n) and constant Tmin, as shown in formula (3); and when mode control signal is at the third state, switching circuit 31 works under the second discontinuous current mode, delay time computing module 71 is configured to provide delay time period Td1(n) based on peak current sampling signal Ipk(n), current reference signal Iref(n) and constant Tmax, as shown in formula (4). Delay time adjusting module 72 is configured to adjust turn ON delay time period Td(n) exactly based on delay time period Td1(n) and oscillation period Tzcd of input current Iin. In one embodiment, turn ON delay time period Td(n) equals (K+0.5)*Tzcd, where K is an integer which makes Td(n) as close to delay time period Td1(n) as possible. For example, if oscillation period Tzcd is 1 second, delay time period Td1(n) is 3.4 second, then (K+0.5)*Tzcd equals 1.5 second when K=1, (K+0.5)*Tzcd equals 2.5 second when K=2, (K+0.5)*Tzcd equals 3.5 second when K=3, and (K+0.5) *Tzcd equals 4.5 second when K=4. Where (K+0.5)*Tzcd is closest to Td1(n) when K=3, as a result, turn ON delay time period Td(n)=(K+0.5)*Tzcd=3.5 second, where K=3. In one embodiment, turn ON delay time period Td(n) equals Td1 (n)-Td1(n)mod(Tzcd)+Tzcd/2, where Td1(n)mod(Tzcd) means Td1(n) modulo oscillation period Tzcd, that is a remainder when delay time period Td1(n) is divided by oscillation period Tzcd. For example, if oscillation period Tzcd is 1 second, delay time period Td1(n) is 3.4 second, then Td1(n) modulo Tzcd is 0.4 second, as a result Td(n) =3.4−0.4+½=3.5 second.

Turn ON delay computing module 46 further comprises selective circuit 73. Selective circuit 73 has a first input terminal, a second input terminal, a control terminal and an output terminal, wherein the first input terminal is coupled to an output terminal of delay time adjusting module 72, the second input terminal is coupled to a constant, for example "zero", the control terminal is configured to receive mode control signal Mode, and the output terminal is configured to provide turn ON delay time period Td(n). Selective circuit 73 is configured to select a signal delay time adjusting module 72 provided or "zero" as turn ON delay time period Td(n) based on mode control signal Mode. In one embodiment, when mode control signal Mode is at the first state, turn ON delay time period Td(n) equals zero, and when mode control signal Mode is at the second state or the third state, turn ON delay time period Td(n) is provided by delay time adjusting module 72 based on delay time period Td1($n$) and oscillation period Tzcd of input current Iin. As shown in FIG. 7, turn ON delay computing module 46 is configured to adjust turn ON delay time period Td(n) exactly based on oscillation period Tzcd of input current Iin when mode control signal Mode is the second state or the third state, as a result, power switch M is easy to achieve valley turned ON, and switching loss is reduced and efficiency is improved.

Figure 8:
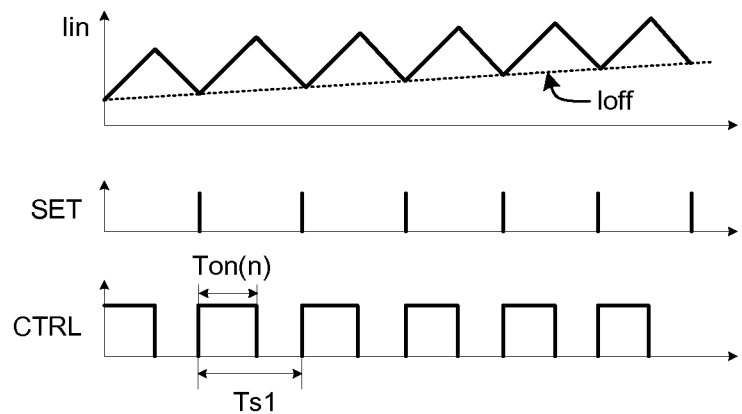
FIG. 8 shows waveforms of a switching circuit 31 300 working under a continuous current mode according to an embodiment of the present invention.

FIG. 8 shows waveforms of switching circuit 31 working under the continuous current mode according to an embodiment of the present invention. In the embodiment shown in FIG. 8, comparison signal SET and switching control signal CTRL are high voltage level effective signal. As shown in FIG. 8, switching circuit 31 works under the continuous current mode, when input current Iin is less than OFF current reference signal Ioff, comparison signal SET becomes high voltage level, switching control signal CTRL becomes high voltage level to turn ON power switch M, and switching control signal CTRL becomes low voltage level to turn OFF power switch M when the ON time period of power switch M achieves predetermined ON time period Ton(n), where predetermined ON time period Ton(n) is determined as formula (1). Switching period Ts1 of power switch M under the continuous current mode is almost constant.

Figure 9:
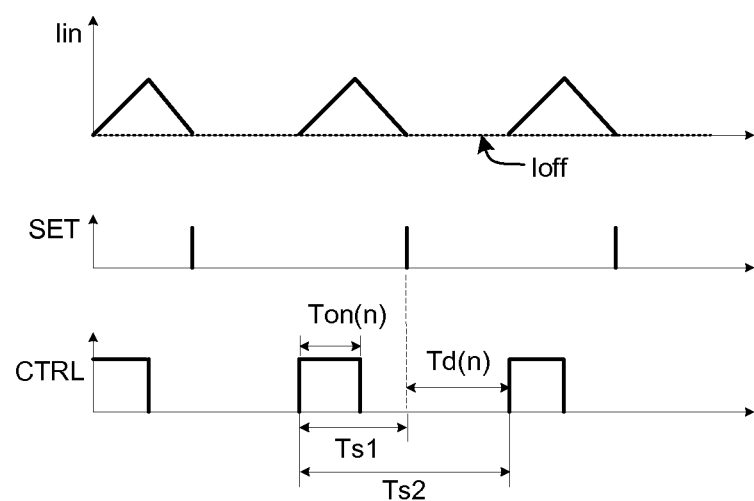
FIG. 9 shows waveforms of switching circuit 31 working under a first discontinuous current mode according to an embodiment of the present invention.

FIG. 9 shows waveforms of switching circuit 31 working under the first discontinuous current mode according to an embodiment of the present invention. In the embodiment shown in FIG. 9, comparison signal SET and switching control signal CTRL are high voltage level effective signal. As shown in FIG. 9, switching circuit 31 works under the first discontinuous current mode, OFF current reference signal Ioff is zero. When input current Iin is less than OFF current reference signal Ioff, comparison signal SET becomes high voltage level, switching control signal CTRL becomes high voltage level to turn ON power switch M after turn ON delay time period Td(n). Switching control signal CTRL becomes low voltage level to turn OFF power switch M when the ON time period of power switch M equals predetermined ON-time period Ton(n). Predetermined ON-time period Ton(n) is determined by formula (1) under the first discontinuous current mode, and a time period that input current Iin maintains continuous equals switching period Ts1. In one embodiment, turn ON delay time period Td(n) equals delay time period Td1($n$) determined by formula (3). In another embodiment, turn ON delay time period Td(n) is provided based on delay time period Td1(1) and oscillation time period Tzcd of input current Iin. Switching period Ts2 of power switch M under the first discontinuous current mode varies with load.

Figure 10:
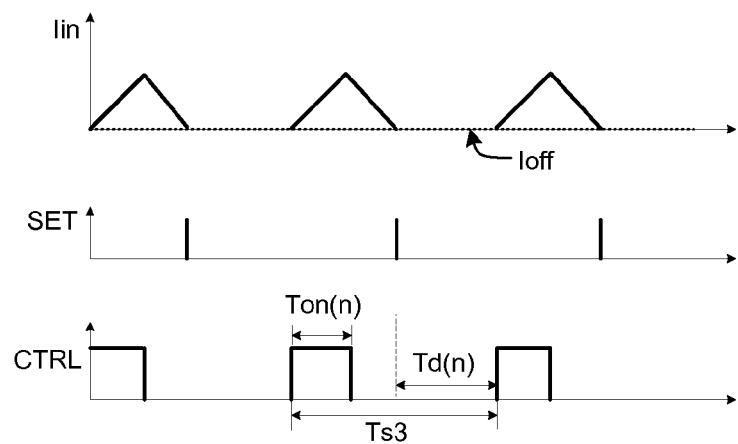
FIG. 10 shows waveforms of switching circuit 31 working under a second discontinuous current mode according to an embodiment of the present invention.

FIG. 10 shows waveforms of switching circuit 31 working under the second discontinuous current mode according to an embodiment of the present invention. In the embodiment shown in FIG. 10, comparison signal SET and switching control signal CTRL are high voltage level effective signal. As shown in FIG. 10, switching circuit 31 works under the second discontinuous current mode, OFF current reference signal Ioff is zero. When input current Iin is less than OFF current reference signal Ioff, comparison signal SET is high voltage level, switching control signal CTRL becomes high voltage level to turn ON power switch M after turn ON delay time period Td(n), and switching control signal CTRL becomes low voltage level to turn OFF power switch M when the ON-time period of switch M achieves predetermined ON-time period Ton(n). Predetermined ON-time period Ton(n) decreases under the second discontinuous current mode, and the switching period of power switch M is limited at a maximum switching period. In one embodiment, predetermined ON-time period Ton(n) under the second discontinuous current mode is determined by formula (2). In one embodiment, turn ON delay time period Td(n) equals delay time period Td1($n$) determined by formula (4). In another embodiment, turn ON delay time period Td(n) is provided based on delay time period Td1($n$) and oscillation period Tzcd of input current Iin. Switching period Ts3 of power switch M is almost constant under the second discontinuous current mode. In one embodiment switching period Ts3 equals the maximum switching period.

Figure 11:
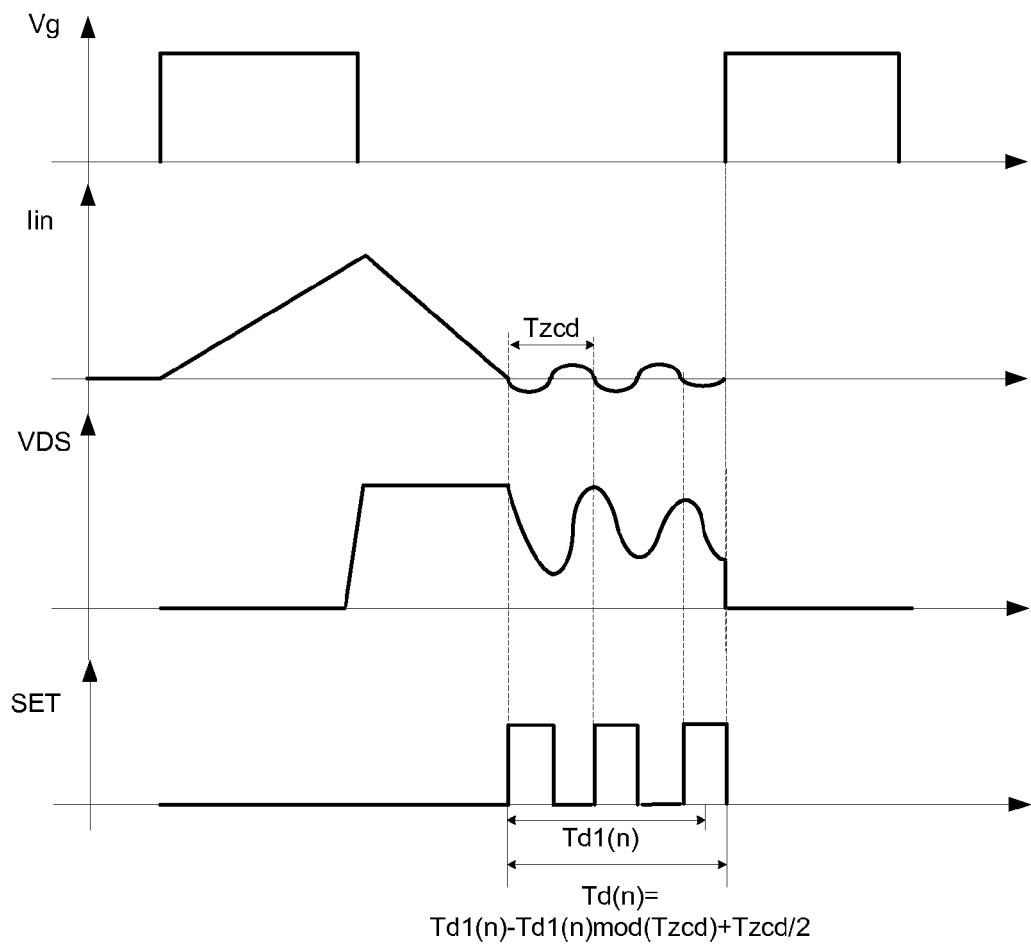
FIG. 11 shows waveforms of adjusting a delay time period exactly when switching circuit 31 works under the first discontinuous current mode or the second discontinuous current mode according to an embodiment of the present invention.

FIG. 11 shows waveforms of adjusting delay time period Td(n) exactly when switching circuit 31 works under the first discontinuous current mode or the second discontinuous current mode according to an embodiment of the present invention. In order to improve efficiency under the first discontinuous current mode and the second discontinuous current mode, turn ON delay computing module 46 is configured to adjust turn ON delay time period Td(n) exactly to achieve valley turn ON of power switch M. As shown in FIG. 11, input current Iin oscillates with oscillation period Tzcd during discontinuous, A Drain-Source voltage VDS across power switch M oscillates thereupon. Turn ON delay time period Td(n) is adjusted exactly to turn ON power switch M at valley of Drain-source voltage VDS. In one embodiment, turn ON delay time period Td(n) is Td1($n$)−Td1($n$)mod(Tzcd)+Tzcd/2, where delay time period Td1($n$) is determined by formula (3) or formula (4). Oscillation period Tzcd may be detected by a counter or a timer. In one embodiment, oscillation period Tzcd is a time interval between input current Iin decreasing less than zero.

Figure 12:
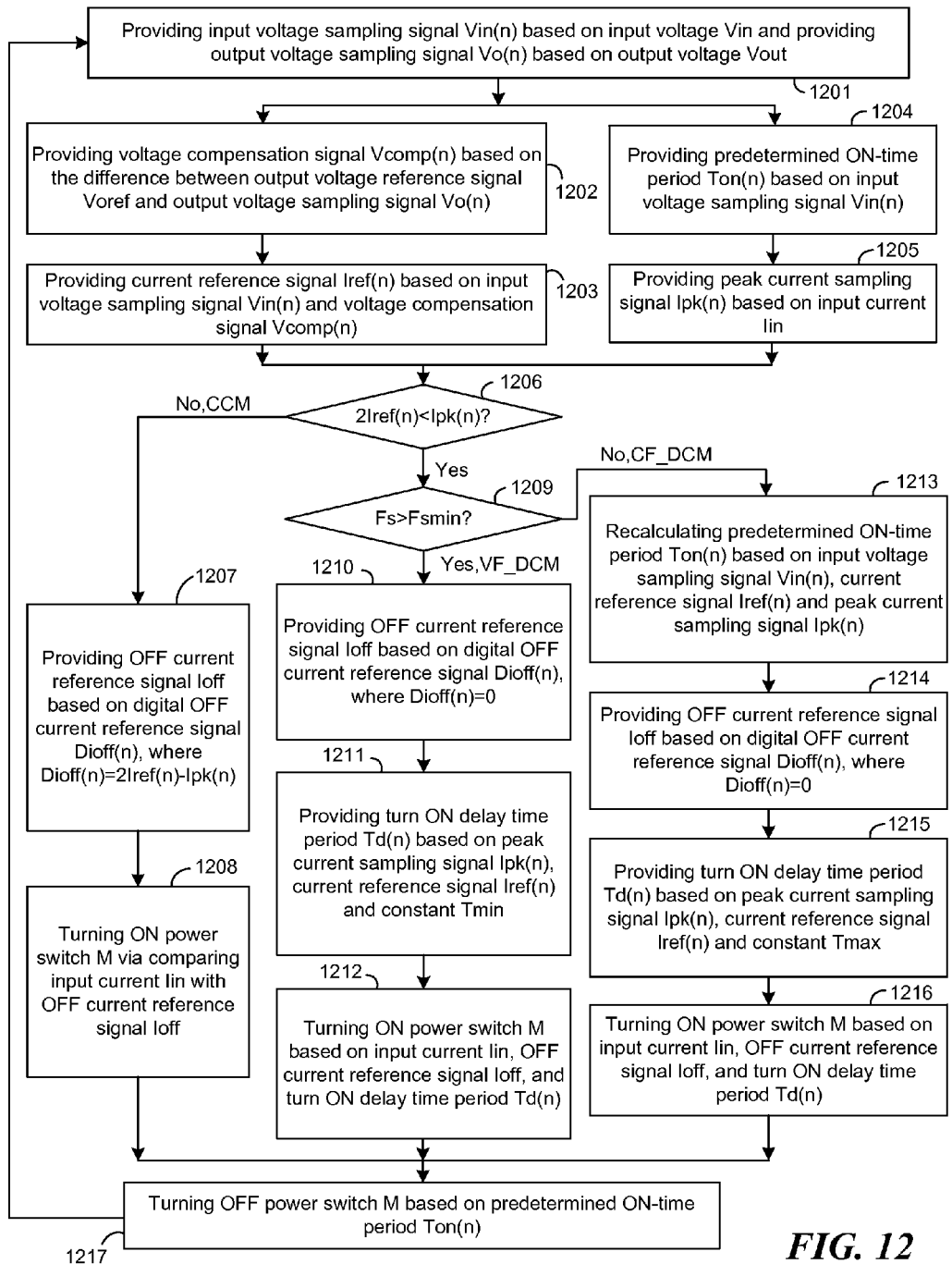
FIG. 12 shows a flow chart illustrating a control method for switching circuit 31 according to an embodiment of the present invention.

FIG. 12 shows a flow chart illustrating a control method for switching circuit 31 according to an embodiment of the present invention. The control method comprises steps 1201-1217.

At step 1201, providing input voltage sampling signal Vin(n) based on input voltage Vin, and providing output voltage sampling signal Vo(n) based on output voltage Vout.

At step 1202, providing voltage compensation signal Vcomp(n) based on the difference between output voltage reference Voref and output sampling signal Vo(n).

At step 1203, providing current reference signal Iref(n) based on input voltage sampling signal Vin(n) and voltage compensation signal Vcomp(n).

At step 1204, providing predetermined ON-time period Ton(n) based on input voltage sampling signal Vin(n).

At step 1205, providing peak current sampling signal Ipk(n) indicative of maximum value of input current Iin.

At step 1206, judging if twice of current reference signal Iref(n) is less than peak current sampling signal Ipk(n). If No, i.e., 2Iref(n)>=Ipk(n), then go to step 1207, switching circuit 31 works under the continuous current mode (CCM). If Yes, i.e., 2Iref(n)<Ipk(n), then go to step 1209.

At step 1207, providing digital OFF current reference signal Dioff(n), where Dioff(n)=2Iref(n)−Ipk(n), and providing OFF current reference signal Ioff based on digital OFF current reference signal Dioff(n).

At step 1208, turning ON power switch M via comparing input current Iin with OFF current reference signal Ioff. In one embodiment, when input current Iin is less than OFF current reference signal Ioff, power switch M is turned ON. Then go to step 1217.

At step 1209, judging if switching frequency Fs is higher than minimum frequency threshold Fsmin. If Yes, i.e., Fs>Fsmin, then go to step 1210-1212, switching circuit 31 works under the first discontinuous current mode (VF_DCM). If No, i.e., Fs<=Fsmin, then go to step 1213-1216, switching circuit 31 works under the second discontinuous current mode (CF_DCM).

At step 1210, providing digital OFF current reference signal Dioff(n), where Dioff(n)=0, and providing OFF current reference signal Ioff based on digital current reference signal Dioff(n).

At step 1211, providing turn ON delay time period Td(n) based on peak current sampling signal Ipk(n), current reference signal Iref(n) and constant Tmin. In one embodiment, under the first discontinuous current mode, turn ON delay time period Td(n) is Tmin*Iref(n)/2Ipk(n)−Tmin. In one embodiment, the control method further comprises providing delay time period Td1($n$) based on peak current sampling signal Ipk(n), current reference signal Iref(n) and constant Tmin, and adjusting turn ON delay time period Td(n) exactly based on delay time period Td1($n$) and oscillation period Tzcd of input current Iin. In one embodiment, turn ON delay time period Td(n) is (K+0.5)*Tzcd, where K is an integer which makes (K+0.5)*Tzcd as close as possible to delay time period Td1($n$). In another embodiment, turn ON delay time period Td(n) is Td1($n$)−Td1($n$)mod(Tzcd)+Tzcd/2.

At step 1212, turning ON power switch M based on input current Iin, OFF current reference signal Ioff and turn ON delay time period Td(n). in one embodiment, when input current Iin is less than OFF current reference signal Ioff, power switch M is turned ON after turn ON delay time period Td(n). Then go to step 1217.

At step 1213, recalculating predetermined ON-time period Ton(n) based on input voltage sampling signal Vin(n), current reference signal Iref(n) and peak current sampling signal Ipk(n).

At step 1214, providing digital OFF current reference signal Dioff(n), where Dioff(n)=0, and providing OFF current reference signal Ioff based on digital OFF current reference signal Dioff(n).

At step 1215, providing turn ON delay time period Td(n) based on peak current sampling signal Ipk(n), current reference signal Iref(n) and constant Tmax. In one embodiment, turn ON delay time period Td(n) is Tmax−2Iref(n)*Tmax/Ipk(n). In one embodiment, the control method further comprises providing delay time period Td1($n$) based on peak current sampling signal Ipk(n), current reference signal Iref(n) and constant Tmax, and adjusting turn ON delay time period Td(n) exactly based on delay time period Td1($n$) and oscillation period Tzcd of input current Iin. In one embodiment, turn ON delay time period Td(n) is (K+0.5)*Tzcd, where K is an integer which makes (K+0.5)*Tzcd as close as possible to delay time period Td1($n$). In another embodiment, turn ON delay time period Td(n) is Td(n)=Td1($n$)−Td1($n$)mod(Tzcd)+Tzcd/2.

At step 1216, turning ON power switch M based on input current Iin, OFF current reference signal Ioff, and turn ON delay time period Td(n). In one embodiment, when input current Iin is less than OFF current reference signal Ioff, power switch M is turned ON after turn ON delay time period Td(n). Then go to step 1217.

At step 1217, turning OFF power switch M based on predetermined ON-time period Ton(n). The above steps repeat.

It is noted that in the flow chart described above, the functional boxes may be implemented as a different sequence. For example, two functional boxes in succession shown in FIG. 12 may be executed in parallel or in a reverse order.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A control method for controlling a power factor correction circuit, wherein the power factor correction circuit comprises a switching circuit having an input terminal configured to receive an input voltage and an input current, and an output terminal configured to provide an output voltage, the control method comprising:

providing a peak current sampling signal indicative of a maximum value of the input current;

providing an input voltage sampling signal indicative of the input voltage;

providing an output voltage sampling signal indicative of the output voltage;

providing a current reference signal based on the input voltage sampling signal, the output voltage sampling signal and a voltage reference signal;

providing a turn ON delay time period based on the peak current sampling signal and the current reference signal;

providing a comparison signal via comparing the input current with an OFF current reference signal;

determining an operation mode of the switching circuit based on the input current and a switching frequency of the switching circuit, wherein the operation mode comprises a continuous current mode, a first discontinuous current mode and a second discontinuous current mode; and turning ON the switching circuit based on the comparison signal, and turning OFF the switching circuit when an ON-time period of the switching circuit equals a predetermined ON-time period; wherein when the switching circuit works under the continuous current mode, turning ON the switching circuit when the input current is less than the OFF current reference signal, and calculating the predetermined ON-time period based on the input voltage sampling signal; wherein and calculating the predetermined ON-time period based on the input voltage sampling signal; and wherein when the switching circuit works under the second discontinuous current mode, turning ON the switching circuit after the turn ON delay time period when the input current is less than the OFF current reference signal, and calculating the predetermined ON-time period based on the input voltage sampling signal, the current reference signal and the peak current sampling signal.

2. The control method of claim 1, further comprising:
when twice of the current reference signal is larger than or equals the peak current sampling signal, the switching circuit transits to the continuous current mode, and the OFF current reference signal is provided based on the current reference signal and the peak current sampling signal;
when twice of the current reference signal is smaller than the peak current sampling signal and a switching frequency of the switching circuit is higher than a minimum frequency threshold, the switching circuit transits to the first discontinuous current mode, and the OFF current reference signal equals a constant; and
when twice of the current reference signal is smaller than the peak current sampling signal and the switching frequency of the switching circuit is lower than or equals the minimum frequency threshold, the switching circuit transits to the second discontinuous current mode, and the OFF current reference signal equals the constant.

3. The control method of claim 1, wherein when the switching circuit works under the first discontinuous current mode, the turn ON delay time period equals $Tmin*Iref(n)/2Ipk(n)-Tmin$, where Tmin is constant, Iref(n) is the current reference signal, and Ipk(n) is the peak current sampling signal.

4. The control method of claim 1, wherein when the switching circuit works under the second discontinuous current mode, the turn ON delay time period equals $Tmax-2Iref(n)*Tmax/Ipk(n)$, where Tmax is constant, Iref(n) is the current reference signal, and Ipk(n) is the peak current sampling signal.

5. The control method of claim 1, further comprising:
providing a delay time period based on the peak current sampling signal and the current reference signal; and
providing the turn ON delay time period based on the delay time period and an oscillation period of the input current during discontinuous.

6. The control method of claim 5, wherein when the switching circuit works under the first discontinuous current mode, the delay time period equals $Tmin*Iref(n)/2Ipk(n)-Tmin$, and when the switching circuit works under the second discontinuous current mode, the delay time period equals $Tmax-2Iref(n)*Tmax/Ipk(n)$, where Tmin and Tmax are constant, Iref(n) is the current reference signal, and Ipk(n) is the peak current sampling signal.

7. The control method of claim 5, wherein the turn ON delay time period equals $(K+0.5)Tzcd$, where Tzcd is the oscillation period of the input current during discontinuous, and K is an integer making $(K+0.5)Tzcd$ as close as possible to the delay time period.

8. The control method of claim 5, wherein the turn ON delay time period equals $Td1(n)-Td1(n)\mod(Tzcd)+Tzcd/2$, where $Td1(n)$ is the delay time period, Tzcd is the oscillation period of the input current during discontinuous.

9. A control circuit for controlling a power factor correction circuit, wherein the power factor correction circuit comprises a switching circuit having an input terminal configured to receive an input voltage and an input current, and an output terminal configured to provide an output voltage, the control circuit comprising:
an AD conversion control module configured to provide an input voltage sampling signal based on the input voltage, an output voltage sampling signal based on the output voltage, and a peak current sampling signal based on the input current;
a DA conversion unit configured to provide an OFF current reference signal based on a digital OFF current reference signal;
a current reference computing module configured to provide a current reference signal based on the input voltage sampling signal and the output voltage sampling signal;
a mode control module configured to provide a mode control signal based on the current reference signal, the peak current sampling signal and a switching frequency of the switching circuit; and
a pulse generator configured to provide a switching control signal to control the switching circuit, wherein the switching control signal is configured to turn OFF the switching circuit based on a predetermined ON-time period; wherein
when the mode control signal is at a first state, the switching circuit works under a continuous current mode, and the switching control signal is configured to turn ON the switching circuit when a feedback signal indicative of the input current is less than the OFF current reference signal; wherein
when the mode control signal is at a second state, the switching circuit works under a first discontinuous current mode, and the switching control signal is configured to turn ON the switching circuit after a turn ON delay time period when the feedback signal indicative of the input current is less than the OFF current reference signal; and wherein
when the mode control signal is at a third state, the switching circuit works under a second discontinuous current mode, and the switching control signal is configured to turn ON the switching circuit after the turn ON delay time period when the feedback signal indicative of the input current is less than the OFF current reference signal.

10. The control circuit of claim 9, wherein the control circuit further comprises:
an OFF current computing module configured to provide the digital OFF current reference signal based on the mode control signal, the current reference signal and the peak current sampling signal;
an ON-time period computing module configured to provide the predetermined ON-time period, wherein when the mode control signal is at the first state or the second state, the predetermined ON-time period is provided based on the input voltage sampling signal, and when the mode control signal is at the third state, the predetermined ON-time period is provided based on the input voltage sampling signal, the current reference signal and the peak current sampling signal; and
a turn ON delay computing module configured to provide the turn ON delay time period based on the current reference signal, the peak current sampling signal and a first constant when the mode control signal is at the second state, and provide the turn ON delay time period based on the current reference signal, the peak current sampling signal and a second constant when the mode control signal is at the third state, wherein the first constant is less than the second constant.

11. The control circuit of claim 10, wherein when the mode control signal is at the first state, the digital OFF current reference signal equals twice of the current reference signal minus the peak current sampling signal, and wherein when the mode control signal is at the second state or the third state, the digital OFF current reference signal is constant.

12. The control circuit of claim 9, wherein the control circuit further comprises:
- a delay time computing module having a first input terminal, a second input terminal, a control terminal and an output terminal, wherein the first input terminal is configured to receive the current reference signal, the second input terminal is configured to receive the peak current sampling signal, the control terminal is configured to receive the mode control signal, the delay time computing module is configured to provide a delay time period at the output terminal based on the current reference signal, the peak current sampling signal and a first constant when the mode control signal is at the second state, and the delay time computing module is configured to provide the delay time period at the output terminal based on the current reference signal, the peak current sampling signal and a second constant when the mode control signal is at the third state;
- a delay time adjusting module having a first input terminal, a second input terminal and an output terminal, wherein the first input terminal is coupled to the output terminal of the delay time computing module to receive the delay time period, the second input terminal is configured to receive an oscillation period of the input current during discontinuous; and
- a selective circuit having a first input terminal, a second input terminal, a control terminal and an output terminal, wherein the first input terminal is coupled to the output terminal of the delay time adjusting module, the second input terminal is configured to receive a third constant, the control terminal is configured to receive the mode control signal, the selective circuit is configured to provide the turn ON delay time period at the output terminal based on the third constant when the mode control signal is at the first state, and the selective circuit is configured to provide the turn ON delay time period at the output terminal based on the delay time period and the oscillation period of the input current during discontinuous when the mode signal is at the second state or the third state.

13. The control circuit of claim 9, wherein the current reference computing module further comprises:
- a compensator configured to provide a voltage compensation signal based on the output voltage sampling signal and an output voltage reference signal;
- a filter configured to provide an average signal representing an average of the input voltage sampling signal; and
- a multiplying circuit configured to provide the current reference signal based on the voltage compensation signal, the input voltage sampling signal and the average signal.

14. The control circuit of claim 9, wherein when twice of the current reference signal is larger than or equals the peak current sampling signal, the mode control signal transits to the first state, when twice of the current reference signal is smaller than the peak current sampling signal and the switching frequency of the switching circuit is higher than a minimum frequency threshold, the mode control signal transits to the second state, and when twice of the current reference signal is smaller than the peak current sampling signal and the switching frequency of the switching circuit is lower than or equals the minimum frequency threshold, the mode control signal transits to the third state.

15. A power factor correction circuit, comprising:
- a switching circuit having an input terminal and an output terminal, wherein the input terminal is configured to receive an input voltage and an input current, and the output terminal is configured to provide an output voltage;
- an AD conversion control module configured to provide an input voltage sampling signal indicative of the input voltage, an output voltage sampling signal indicative of the output voltage, and a peak current sampling signal indicative of indicative of the input current;
- a DA conversion unit configured to provide an OFF current reference signal based on a digital OFF current reference signal;
- a comparison circuit configured to provide a comparison signal based on the OFF current reference signal and the input current;
- a mode control module configured to provide a mode control signal based on a current reference signal, the peak current sampling signal and a switching frequency of the switching circuit; and
- a pulse generator configured to turn ON the switching circuit based on the comparison signal and a turn ON delay time period, and turn OFF the switching circuit based on a predetermined ON-time period; wherein
- when the mode control signal is at a first state, the switching circuit works under a continuous current mode, the predetermined ON-time period is provided based on the input voltage sampling signal, when the mode control signal is at a second state, the switching circuit works under a first discontinuous current mode, the predetermined ON-time period is provided based on the input voltage sampling signal, and when the mode control signal is at a third state, the switching circuit works under a second discontinuous current mode, the predetermined ON-time period is provided based on the input voltage sampling signal, the current reference signal and the peak current sampling signal, wherein the switching frequency of the switching circuit is constant when the switching circuit works under the second discontinuous current mode.

16. The power factor correction circuit of claim 15, wherein the power factor correction circuit further comprises:
- an OFF current computing module configured to provide the digital OFF current reference signal based on the mode control signal, the current reference signal and the peak current sampling signal; wherein
- when the mode control signal is at the first state, the digital OFF current reference signal is provided based on the current reference signal and the peak current sampling signal; and wherein
- when the mode control signal is at the second state or the third state, the digital OFF current reference signal is constant.

17. The power factor correction circuit of claim 15, wherein the power factor correction circuit further comprises:
- a current reference computing module configured to provide the current reference signal based on the input voltage sampling signal and the output voltage sampling signal; wherein
- the current reference computing module further comprises:
  - a compensator configured to provide a voltage compensation signal based on the output voltage sampling signal and an output voltage reference signal;
  - a filter configured to provide an average signal representing an average value of the input voltage sampling signal; and a multiplying circuit configured to provide the current reference signal based on the voltage compensation signal, the input voltage sampling signal and the average signal.

18. The power factor correction circuit of claim 15, wherein the power factor correction circuit further comprises:
 a turn ON delay computing module configured to provide the turn ON delay time period; wherein
 when the mode control signal is at the first state, the turn ON delay time period is zero; wherein
 when the mode control signal is at the second state, the turn ON delay time period is provided based on the peak current sampling signal, the current reference signal and a first target switching period of the switching circuit under the continuous current mode; and wherein
 when the mode control signal is at the third state, the turn ON delay time period is provided based on the peak current sampling signal, the current reference signal and a second target switching period of the switching circuit under the second discontinuous current mode.

19. The power factor correction circuit of claim 15, wherein the power factor correction circuit further comprises:
 a turn ON delay computing module configured to provide the turn ON delay time period; wherein
 when the mode control signal is at the first state, the turn ON delay time period is zero; wherein
 when the mode control signal is at the second state, the turn ON delay time period is provided based on the peak current sampling signal, the current reference signal, an oscillation period of the input current and a first constant; and wherein
 when the mode control signal is at the third state, the turn ON delay time period is provided based on the peak current sampling signal, the current reference signal, the oscillation period of the input current and a second constant.

20. The power factor correction circuit of claim 15, wherein the power factor correction circuit further comprises:
 an ON-time period computing module configured to provide the predetermined ON-time period.

* * * * *